(12) United States Patent
Yen

(10) Patent No.: US 8,578,666 B2
(45) Date of Patent: Nov. 12, 2013

(54) SOLAR DEVICE

(75) Inventor: Tung-I Yen, Taichung (TW)

(73) Assignee: Au Optronics Corporation, Hsinchu (TW)

( * ) Notice: Subject to any disclaimer, the term of this patent is extended or adjusted under 35 U.S.C. 154(b) by 172 days.

(21) Appl. No.: 13/169,041

(22) Filed: Jun. 27, 2011

(65) Prior Publication Data

US 2012/0273028 A1 Nov. 1, 2012

(30) Foreign Application Priority Data

Apr. 28, 2011 (TW) ............................. 100114934 A

(51) Int. Cl.
E04D 13/18 (2006.01)
E04H 14/00 (2006.01)

(52) U.S. Cl.
USPC .... 52/173.3; 52/202; 52/204.597; 52/204.72; 52/764; 52/780; 52/475.1; 126/621; 126/623; 136/251; 136/244; 439/527; 248/237; 248/205.1

(58) Field of Classification Search
USPC ................. 52/22, 27, 173.3, 698, 511, 582.2, 52/586.1, 562, 592.1, 58, 200, 202, 52/204.597, 204.591, 204.72, 582.1, 764, 52/475.1, 780; 248/237, 519, 518, 65, 248/205.1; 411/56, 70, 57.1; 126/621, 623; 136/251, 244; 439/527; 403/292
See application file for complete search history.

(56) References Cited

U.S. PATENT DOCUMENTS

| | | | | |
|---|---|---|---|---|
| 4,312,165 | A * | 1/1982 | Mizusawa .......................... | 52/511 |
| 6,269,596 | B1 * | 8/2001 | Ohtsuka et al. ................ | 52/173.3 |
| 6,672,018 | B2 * | 1/2004 | Shingleton ..................... | 52/173.3 |
| 6,959,517 | B2 * | 11/2005 | Poddany et al. .............. | 52/173.3 |
| 7,406,800 | B2 * | 8/2008 | Cinnamon et al. ............ | 52/173.3 |
| 7,592,537 | B1 * | 9/2009 | West .............................. | 136/251 |
| 7,866,098 | B2 | 1/2011 | Cinnamon | |
| 7,987,641 | B2 * | 8/2011 | Cinnamon ..................... | 52/173.3 |
| 8,153,700 | B2 * | 4/2012 | Stearns et al. ................... | 521/58 |
| 8,181,398 | B2 * | 5/2012 | Stearns et al. ................... | 52/58 |
| 8,225,557 | B2 * | 7/2012 | Stearns et al. ................... | 52/58 |
| 8,272,174 | B2 * | 9/2012 | Stearns et al. ................... | 52/58 |

FOREIGN PATENT DOCUMENTS

TW 201017080 5/2010
WO 2008124158 10/2008

OTHER PUBLICATIONS

"First Office Action of China Counterpart Application", issued on Jan. 4, 2013, p. 1-p. 6, in which the listed reference was cited.

* cited by examiner

Primary Examiner — Chi Q Nguyen

(74) Attorney, Agent, or Firm — Jianq Chyun IP Office

(57) ABSTRACT

A solar device for being configured on a platform is provided. The solar device includes a solar module, a splicing member, and a bracket. The solar module has a first connection hole. The splicing member has a body, a first latching pin, and a second latching pin. The first and second latching pins extend from the body and face against each other. The bracket is fixed to the platform and has a second connection hole. The first latching pin passes through and is locked to the first connection hole correspondingly, and the second latching pin passes through and is locked to the second connection hole correspondingly, such that the splicing member is connected between the solar module and the bracket.

7 Claims, 5 Drawing Sheets

SOLAR DEVICE

CROSS-REFERENCE TO RELATED APPLICATION

This application claims the priority benefit of Taiwan application serial no. 100114934, filed on Apr. 28, 2011. The entirety of the above-mentioned patent application is hereby incorporated by reference herein and made a part of this specification.

BACKGROUND OF THE INVENTION

1. Field of the Invention

The invention relates to a mountable structure. More particularly, the invention relates to a mountable solar device.

2. Description of Related Art

In consideration of energy shortage and environmental pollution in recent years, renewable energy which is more friendly to environment and theoretically inexhaustible has become a focus of energy development. The renewable energy includes solar energy, wind energy, tidal energy, biomass energy, and so forth. In the solar device, for instance, a photovoltaic (PV) cell capable of directly converting solar energy into electric energy has attracted the attention of researchers of energy development.

Nonetheless, the complicated solar device to be configured on a platform requires a number of components, and thus the costs on the components and labor for configuring the solar device cannot be effectively lowered down. Accordingly, how to simplify the structure and reduce the set-up time of the solar device deserves further research.

SUMMARY OF THE INVENTION

The invention is directed to a solar device that can be conveniently and easily configured.

In an embodiment of the invention, a solar device for being configured on a platform is provided. The solar device includes a solar module, a splicing member, and a bracket. The solar module has a first connection hole. The splicing member has a body, a first latching pin, and a second latching pin. The first and second latching pins extend from the body and face against each other. The bracket is fixed to the platform and has a second connection hole. The first latching pin passes through and is locked to the first connection hole correspondingly, and the second latching pin passes through and is locked to the second connection hole correspondingly, such that the splicing member is connected between the solar module and the bracket.

According to an embodiment of the invention, the solar module includes a solar cell board and a frame. The frame surrounds the solar cell board and is assembled to the solar cell board, and the splicing member is connected between the frame and the bracket.

According to an embodiment of the invention, the first connection hole is located on a bottom surface or a side surface of the frame.

According to an embodiment of the invention, the body, the first latching pin, and the second latching pin are coaxial columns.

According to an embodiment of the invention, the first and second connection holes are gourd-shaped holes, and each of the first and second connection holes has a through portion and a locking portion. The first and second latching pins respectively pass through the through portions, move toward the locking portions, and are locked to the locking portions.

According to an embodiment of the invention, when the solar module is connected to the bracket through the splicing member and at an orthogonal projection of the first connection hole on the second connection hole, the locking portion of the first connection hole is overlapped with the locking portion of the second connection hole, and the through portion of the first connection hole is not overlapped with the through portion of the second connection hole.

According to an embodiment of the invention, the second latching pin has a pin surface. When the second latching pin is locked to the second connection hole, the pin surface is held by a sidewall of the second connection hole. Here, at least one of the pin surface and the sidewall of the second connection hole is a rough surface.

As described in the previous embodiments of the invention, the latching pins of the splicing member are respectively locked to the first connection hole of the solar module and the second connection hole of the bracket, such that the solar device can be efficiently and easily fixed onto the platform. Thereby, the number of components required for configuring the solar device can be effectively reduced, and the structural reliability of the solar device can be improved because of the secure locking mechanism between the latching pins and the connection holes.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the invention.

DESCRIPTION OF EMBODIMENTS

Figure 1:
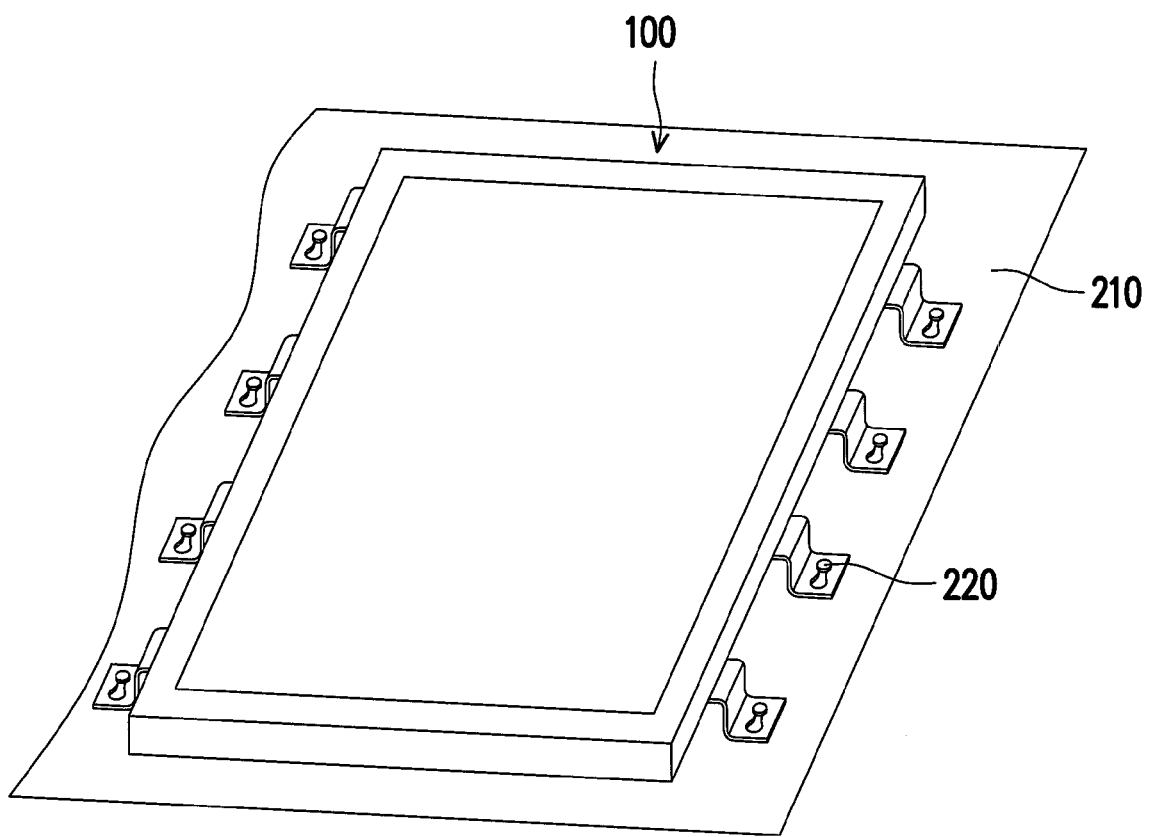
FIG. 1 is a schematic view illustrating a solar device according to an embodiment of the invention.
Figure 2:
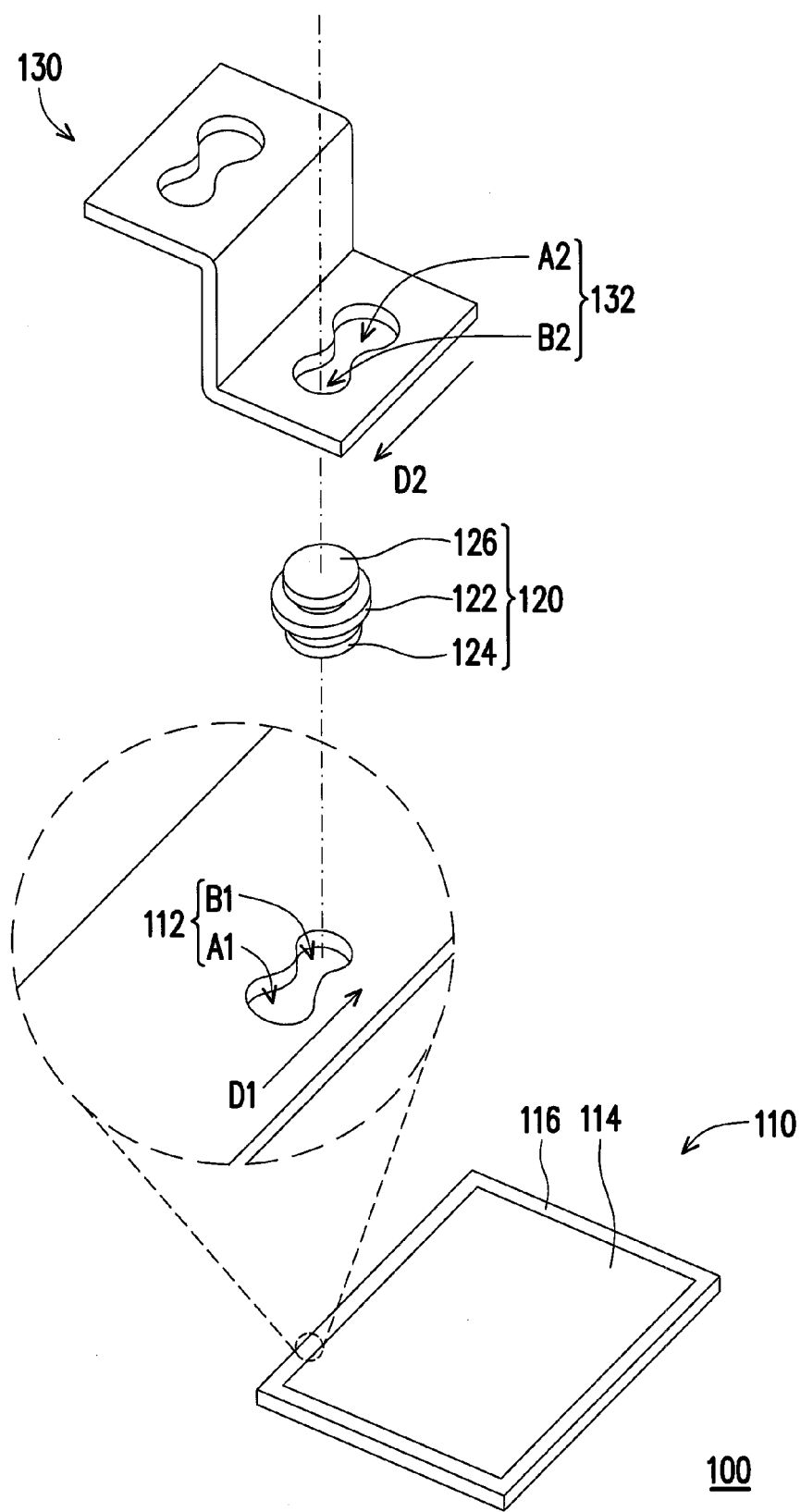
FIG. 2 is a schematic view illustrating the assembly of the solar device depicted in FIG. 1.

FIG. 1 is a schematic view illustrating a solar device according to an embodiment of the invention. FIG. 2 is a schematic view illustrating the assembly of the solar device depicted in FIG. 1. Here, FIG. 2 and FIG. 1 are drawn from reverse view angles. With reference to FIG. 1 and FIG. 2, in this embodiment, the solar device 100 is suitable for being configured on a platform 210. The solar device 100 includes a solar module 110, a plurality of splicing members 120, and a plurality of brackets 130. The brackets 130 serve to support the solar module 110. The number of the brackets 130 is not limited in the invention, and one splicing member 120 and one bracket 130 are given below to describe the invention. The solar module 110 has a first connection hole 112. The splicing member 120 has a body 122, a first latching pin 124, and a second latching pin 126. The first and second latching pins 124 and 126 extend from the body 122 and face against each other. The bracket 130 can be fixed onto the platform 210 by a screw 220. Besides, the bracket 130 has a second connection hole 132. Since the first latching pin 124 passes through and is locked to the first connection hole 112 correspondingly, and the second latching pin 126 passes through and is locked to the second connection hole 132 correspondingly, the splicing member 120 can be connected between the solar module 110 and the bracket 130. Thereby, the solar device 100 can be configured on the platform 210.

In view of the above, the back-to-back latching pins 124 and 126 of the splicing member 120 are respectively locked to the first connection hole 112 of the solar module 110 and the second connection hole 132 of the bracket 130, and accordingly the solar device 100 can be fixed onto the platform 210. As a result, the reduced number of the components for configuring the solar device 100 is conducive to the decrease in the time for configuring the solar device 100. Moreover, the labor cost on configuring the solar device 100 can also be lowered down.

Figure 3:
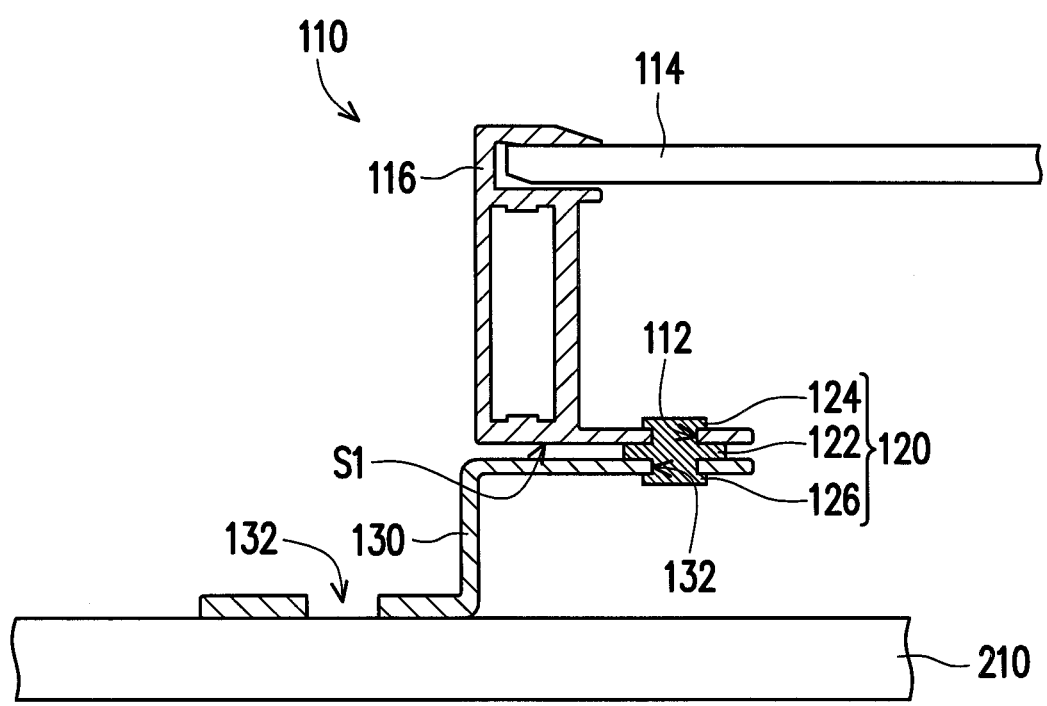
FIG. 3 is a partial cross-sectional view illustrating the solar device depicted in FIG. 1.

FIG. 3 is a partial cross-sectional view illustrating the solar device depicted in FIG. 1. With reference to FIG. 1 to FIG. 3, particularly, the solar module 110 of this embodiment includes a solar cell board 114 and a frame 116. The frame 116 surrounds the solar cell board 114 and is assembled to the solar cell board 114. The first connection hole 112 is located on the frame 116, such that the splicing member 120 is connected between the frame 116 and the bracket 130. The first connection hole 112 is substantially located on the bottom surface S1 of the frame 116, and thereby the solar module 110 can directly lean against the bracket 130. Here, the splicing member 120 is locked to the first connection hole 112 on the frame 116 and then locked to the second connection hole 132 of the bracket 130. The body 122 of the splicing member 120 can thus serve as a clamping board that clamps the frame 116 and the bracket 130.

Figure 4A:
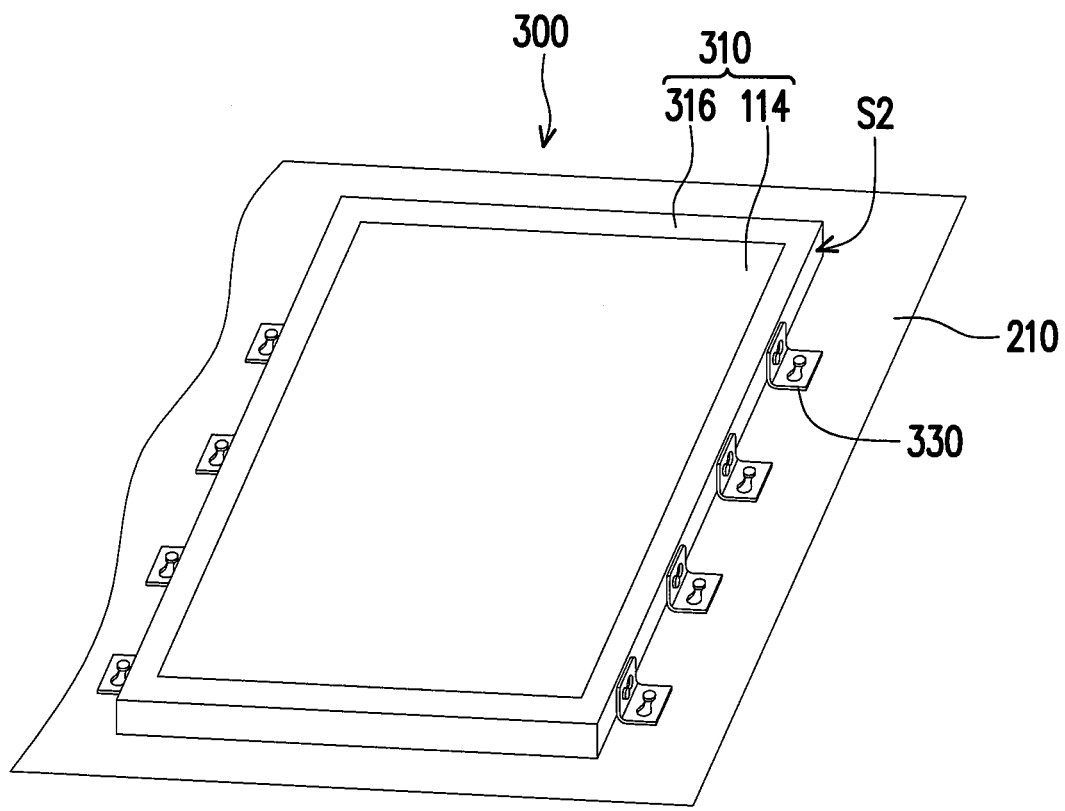
FIG. 4A is a schematic view illustrating a solar device according to another embodiment of the invention.
Figure 4B:
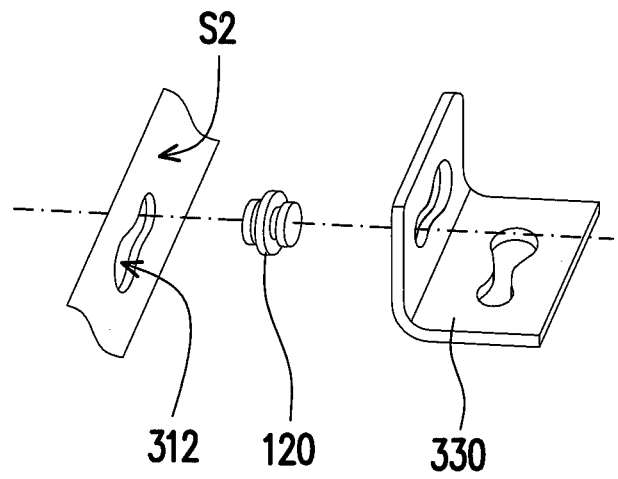
FIG. 4B is a schematic view illustrating the assembly of a portion of the solar device depicted in FIG. 4A.

The location of the splicing member 120 on the frame 116 is not limited in the invention. FIG. 4A is a schematic view illustrating a solar device according to another embodiment of the invention. FIG. 4B is a schematic view illustrating the assembly of a portion of the solar device depicted in FIG. 4A. With reference to FIG. 4A and FIG. 4B, the solar device 300 of this embodiment is different from the solar device 100 described above. Specifically, in the solar device 300, the first connection hole 312 is located on a side surface S2 of the frame 316. Thereby, the splicing member 120 can still clamp and support the frame 316 and the bracket 330, as described in the previous embodiment. Moreover, the inclined angle of the solar module 310 with respect to the platform 210 can be adjusted based on the location of the first connection hole 312 on the side surface S2. As such, the angle at which the solar device 300 is exposed to the sun can be adjusted in response to the latitude.

With reference to FIG. 2, in this embodiment, the body 122, the first latching pin 124, and the second latching pin 126 of the splicing member 120 are coaxial columns, and the first and second connection holes 112 and 132 are gourd-shaped holes. Each of the first and second connection holes 112 and 132 has a through portion A1, A2 and a locking portion B1, B2. When the splicing member 120 is to be locked to the first connection hole 112, the first latching pin 124 needs to pass through the through portion A1 of the first connection hole 112, and the splicing member 120 is moved toward a first direction D1, such that the first latching pin 124 can be locked to the locking portion B1. Similarly, the second latching pin 126 passes through the through portion A2 of the second connection hole 132, and the splicing member 120 is moved toward a second direction D2, such that the second latching pin 126 can be locked to the locking portion B2 of the second connection hole 132. Since the connection holes 112 and 132 have the gourd-shaped profile, the solar module 110 and the bracket 130 can be slidably connected by the splicing member 120.

After the solar module 110 is connected to the bracket 130 through the splicing member 120 and at an orthogonal projection of the first connection hole 112 on the second connection hole 132, the locking portion B1 of the first connection hole 112 is overlapped with the locking portion B2 of the second connection hole 132, and the through portion A1 of the first connection hole 112 is not overlapped with the through portion A2 of the second connection hole 132. That is to say, forces on the splicing member 120 provided by the first and second connection holes 112 and 132 are in reverse directions, and thereby the clamping strength between the solar module 110 and the splicing member 120 and the clamping strength between the bracket 130 and the splicing member 120 are in reverse directions. The structural strength of the assembly of the solar device 100 is thus improved. In other words, the force that is exerted to disassemble the solar module 110 from the splicing member 120 is opposite to the force that is exerted to disassemble the bracket 130 from the splicing member 120. As a result, the solar module 110 and the bracket 130 are not very much likely to be disconnected due to external forces.

Figure 5:
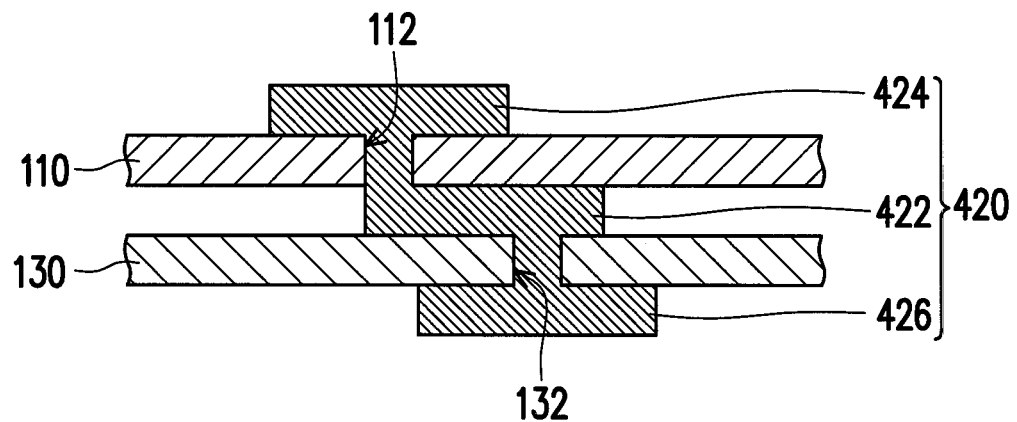
FIG. 5 is a partial cross-sectional view illustrating a splicing member of the solar device according to still another embodiment of the invention.

FIG. 5 is a partial cross-sectional view illustrating a splicing member of the solar device according to still another embodiment of the invention. As shown in FIG. 5, the difference between the solar device in this embodiment and the solar device described in the previous embodiments lies in that the body 422, the first latching pin 424, and the second latching pin 426 in the splicing member 420 are not coaxial columns in this embodiment. Thereby, after the solar module 110 and the bracket 130 are connected through the splicing member 420, the clamping strength among the solar module 110, the splicing member 420, and the bracket 130 can be enhanced due to the interlaced connection holes 112 and 132, i.e., the solar module 110, the splicing member 420, and the bracket 130 cannot be easily disconnected.

Figure 6:
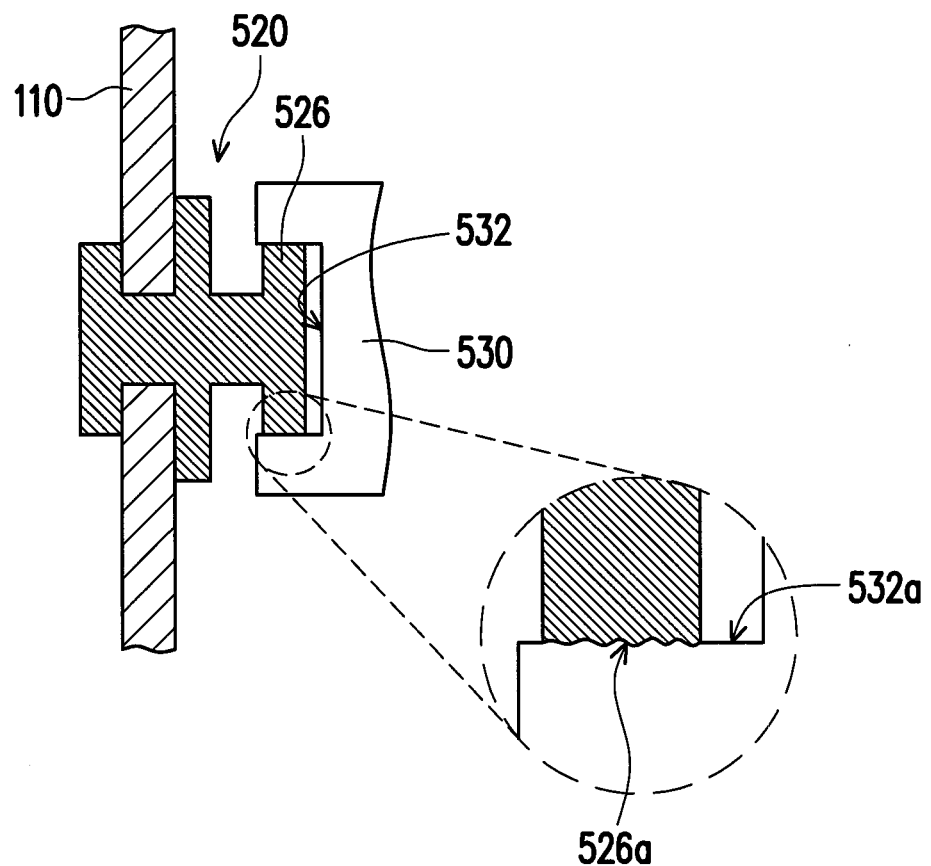
FIG. 6 is a partial cross-sectional view illustrating a splicing member of the solar device according to another embodiment of the invention.

FIG. 6 is a partial cross-sectional view illustrating a splicing member of the solar device according to another embodiment of the invention. With reference to FIG. 6, the difference between the solar device in this embodiment and the solar device described in the previous embodiments lies in that the second latching pin 526 of the splicing member 520 in this embodiment has a pin surface 526a. When the second latching pin 526 is locked to the second connection hole 532, the pin surface 526a is held by the sidewall 532a of the second connection hole 532. Thereby, the splicing member 520 can be locked to the second connection hole 532 as well. Additionally, at least one of the pin surface 526a and the sidewall 532a of the second connection hole 532 is a rough surface for increasing friction between the second connection hole 532 and the second latching pin 526, so as to enhance the clamping strength between the splicing member 520 and the bracket 530. The same structural design can be applied to the first latching pin and the first connection hole, and thus no further description is given herein.

In light of the foregoing, the latching pins of the splicing member, as described in the embodiments of the invention, are respectively locked to the first connection hole of the solar module and the second connection hole of the bracket, such that the solar device can be efficiently and easily fixed onto the platform. Thereby, the structural reliability of the solar device can be improved because of the secure locking mechanism between the latching pins and the connection holes. Furthermore, the number of components required for configuring the solar device can be effectively reduced, and the required components can be simplified. As such, the time for configuring the solar device can be effectively reduced, and the labor cost on configuring the solar device can also be lowered down.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A solar device for being configured on a platform, the solar device comprising:
    a solar module having a first connection hole and comprising a solar cell board and a frame surrounding the solar cell board;
    a splicing member having a body, a first latching pin, and a second latching pin, the first and second latching pins extending from the body and facing against each other; and
    a bracket fixed to the platform and having a second connection hole, wherein the first latching pin passes through and is locked to the first connection hole correspondingly, the second latching pin passes through and is locked to the second connection hole correspondingly, such that the splicing member is connected between the solar module and the bracket, and the body is clamped between the frame and the bracket.

2. The solar device as recited in claim 1, wherein the first connection hole is located on a bottom surface or a side surface of the frame.

3. The solar device as recited in claim 1, wherein the body, the first latching pin, and the second latching pin are coaxial columns.

4. The solar device as recited in claim 1, wherein the first and second connection holes are gourd-shaped holes, each of the first and second connection holes has a through portion and a locking portion, and the first and second latching pins respectively pass through the through portions, move toward the locking portions, and are locked to the locking portions.

5. The solar device as recited in claim 4, wherein when the solar module is connected to the bracket through the splicing member and at an orthogonal projection of the first connection hole on the second connection hole, the locking portion of the first connection hole is overlapped with the locking portion of the second connection hole, and the through portion of the first connection hole is not overlapped with the through portion of the second connection hole.

6. The solar device as recited in claim 1, wherein the second latching pin has a pin surface, and the pin surface is held by a sidewall of the second connection hole when the second latching pin is locked to the second connection hole.

7. The solar device as recited in claim 6, wherein at least one of the pin surface and the sidewall of the second connection hole is a rough surface.

* * * * *